(12) United States Patent
Holzman et al.

(10) Patent No.: US 6,347,299 B1
(45) Date of Patent: Feb. 12, 2002

(54) SYSTEM FOR NAVIGATION AND EDITING OF ELECTRONIC RECORDS THROUGH SPEECH AND AUDIO

(75) Inventors: Thomas G. Holzman, Marietta; Steven C. Miller, Lawrenceville; Monica M. Huff, Decatur; Wesley G. Hunter, Doraville; Dick S. Amin, Duluth; Mark A. Jacobson, Marietta, all of GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/124,511

(22) Filed: Jul. 29, 1998

Related U.S. Application Data

(60) Provisional application No. 60/054,345, filed on Jul. 31, 1997.

(51) Int. Cl.[7] .............................................. G10L 21/00
(52) U.S. Cl. ....................... 704/270; 704/271; 704/275
(58) Field of Search ................................. 704/270, 271, 704/275, 278; 345/966, 968

(56) References Cited

U.S. PATENT DOCUMENTS

| | | | | | |
|---|---|---|---|---|---|
| 5,339,392 A | * | 8/1994 | Risberg et al. | ............. | 395/161 |
| 5,526,407 A | * | 6/1996 | Russell et al. | ................ | 379/89 |
| 5,630,125 A | * | 5/1997 | Zellweger | ................... | 395/614 |
| 5,729,659 A | * | 3/1998 | Potter | ......................... | 704/270 |
| 5,799,273 A | * | 8/1998 | Mitchell et al. | ............ | 704/235 |
| 5,893,064 A | * | 4/1999 | Kurdirka et al. | ............ | 704/275 |
| 5,953,700 A | * | 9/1999 | Kanevsky et al. | .......... | 704/246 |
| 5,970,460 A | * | 10/1999 | Bunce et al. | ............... | 704/278 |

* cited by examiner

Primary Examiner—Richemond Dorvil
Assistant Examiner—Susan McFadden
(74) Attorney, Agent, or Firm—Needle & Rosenberg, P.C.

(57) ABSTRACT

The present invention provides speech and audio user-computer interface mechanisms for accessing and editing information in electronic records. A mechanism is provided by which the user can direct inputs to any of a variety of fields without following a predetermined order of input. This allows the user to be proactive in making entries rather than simply reacting to requirements set by computer-generated prompts. Audio is provided as feedback to the user, not as a fixed path prompt for the user. This feedback can be in the form of non-verbal auditory signals or synthesized speech. The invention uses audio to inform the user of whether or not the system understood the spoken words or phrases as valid inputs to the electronic record, what the system recognized as the input, and to identify the contents of various fields in the electronic record. The precise wording for the speech inputs can be changed from one implementation of the invention to another, depending on what terminology is most meaningful to users, works best with the speech recognition engine being used, etc. Likewise, the audio outputs from the system, both nonverbal sounds and synthesized speech, used in implementing this invention can vary from one application to another.

11 Claims, 5 Drawing Sheets

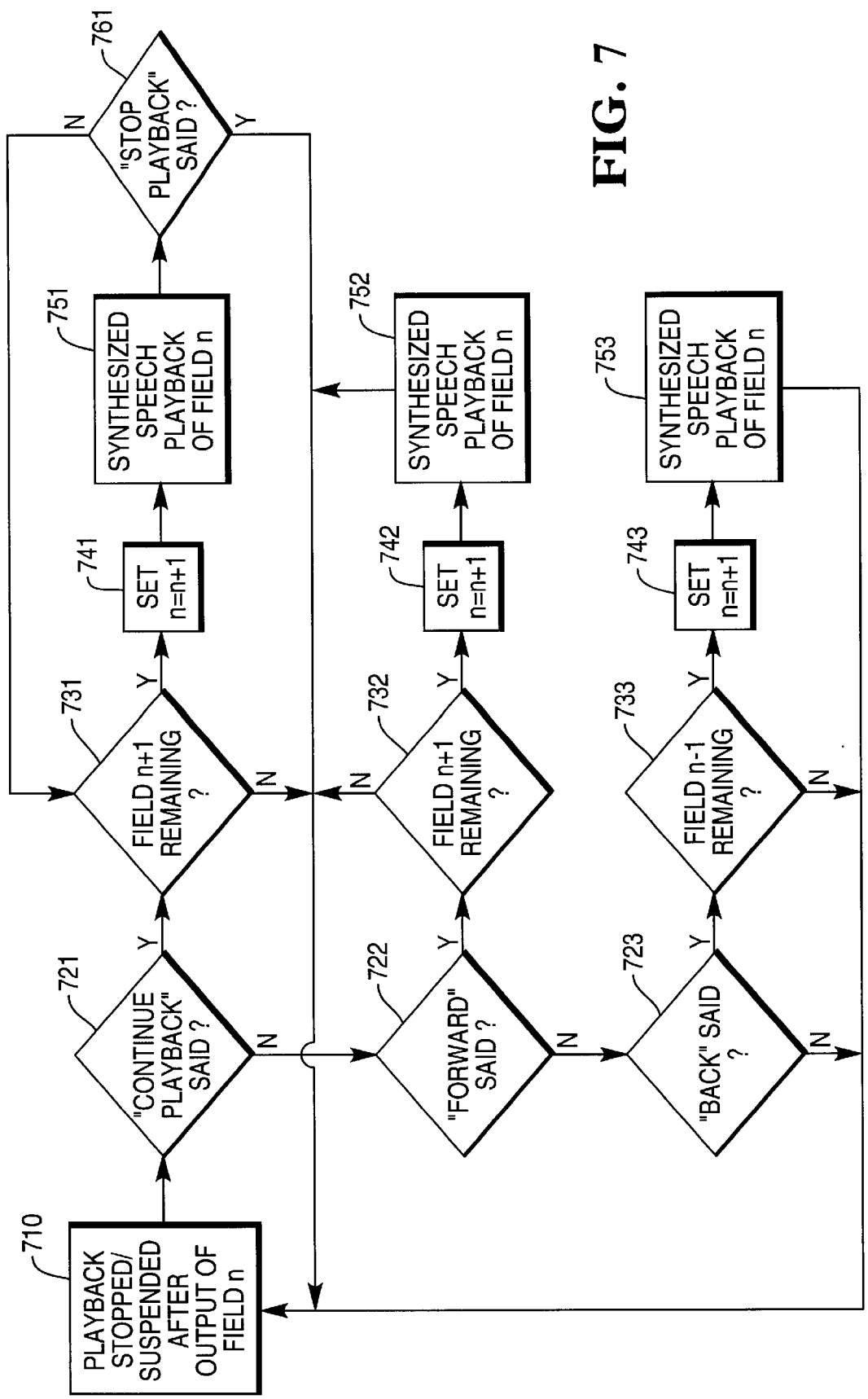

SYSTEM FOR NAVIGATION AND EDITING OF ELECTRONIC RECORDS THROUGH SPEECH AND AUDIO

The present utility patent application claims the benefit of priority of U.S. Provisional Patent Application No. 60/054,345, filed Jul. 31, 1997 and entitled "Navigation and Editing of Electronic Records Through Speech and Audio".

BACKGROUND OF THE INVENTION

1. Field of the Invention

The present invention comprises a human-computer interface for making spoken inputs to an automatic speech recognition system and receiving audio outputs from the computer system in a manner that enables creation, access, and modification of electronic records without visual display of the records and without use of hand-controlled devices, such as keyboard, touch screen, mouse, or other pointing device.

2. Description of the Prior Art

Prior art systems have been developed that allow computers to record and recognize human speech, converting the sound into text or allowing machines to perform different activities in response to different spoken commands. For example, some telephone applications allow users to make selections from auditorially presented lists of choices by saying the number of the choice. However, computers often fail to correctly recognize words and phrases, especially when the allowable vocabulary increases beyond a small set of words (e.g., single digit numbers), when the system is not tailored to the voice and pronunciation of one particular speaker, and when background noise is loud or variable. Also, users themselves sometimes say the wrong thing and wish to correct it, or they may wish to update the contents of a record with a new value. Therefore, for speech recognition to be a practical means of making inputs to electronic records, there must be some means by which the user can obtain feedback about how the computer interpreted the inputs and to correct inputs not properly recognized by the computer, incorrectly input by the user, or in need of updating by the user. The prior art does not provide an efficient mechanism for obtaining feedback about inputs made through speech and for modifying the record without the use of a visual display or manual entries (e.g., made with a keyboard or mouse).

If inputs and queries are to be performed with electronic records without either a display or manual entry mechanism but with the flexibility that accompanies conventional visual-manual entry methods, there must be a way to direct inputs to specific fields in the record, and query the contents of fields. The prior state of the art does not sufficiently address this need. In the prior art, such as interacting with telephone menu systems, fields are typically filled by single word responses made to audio prompts that are provided in a predetermined sequence.

Computer-generated sounds, such as tones, waveforms, and speech have been on the market for years. For example, virtually all personal computers have the ability to emit distinctive tones to signal such things as the successful startup of the operating system, exit from the operating system, and attempts to perform invalid computer operations, among other things. Likewise, there are systems that take typed text as inputs and produce outputs that sound similar to humans speaking the typed inputs. However, these prior systems do not use audio to help a user navigate through an electronic record in combination with a speech recognition system as described in this invention.

SUMMARY OF THE INVENTION

The present invention provides speech and audio user-computer interface mechanisms for accessing and editing information in electronic records. A mechanism is provided by which the user can direct inputs to any of a variety of fields without following a predetermined order of input. This allows the user to be proactive in making entries rather than simply reacting to requirements set by computer-generated prompts.

In the present invention, audio is provided as feedback to the user, not as a fixed path prompt for the user. This feedback can be in the form of non-verbal auditory signals or synthesized speech. The invention uses audio to inform the user of whether or not the system understood the spoken words or phrases as valid inputs to the electronic record, what the system recognized as the input, and to identify the contents of various fields in the electronic record. The precise wording for the speech inputs can be changed from one implementation of the invention to another, depending on what terminology is most meaningful to users, works best with the speech recognition engine being used, etc. Likewise, the audio outputs from the system, both nonverbal sounds and synthesized speech, used in implementing this invention can vary from one application to another. An illustrative set of speech inputs and auditory outputs that could be used to implement this invention is provided.

The present invention is designed to work with electronic records used by interactive computer applications for which fields (and sets of fields, in the case of hierarchically organized records) are defined in advance and names or labels are assigned to those fields (and sets of fields) to make them identifiable through speech. These records are assumed to reside in an electronic storage medium that can be read and accessed by the computer's central processing unit.

Users create or initiate a new electronic record by issuing a spoken command such as "New record." This ensures that a computer file with the predefined record structure is opened so that the user can begin speaking inputs to its fields. Users can work with multiple electronic records through this technique. To distinguish one record from another, the system can assign unique identifiers (e.g., identification numbers) to the record by default, and the user can speak identifying information for the appropriate field(s) of the record (e.g., input the name of the object for which the record was created) as well.

The user can open any record accessible by the application implementing this invention by saying "Open record" followed by any previously assigned identifier for the record. Likewise, a record can be closed by saying "Close record" followed by any appropriate record identifier.

Since the present invention enables users to work with electronic records without being able to see an identifier for the record, a mechanism is provided for querying the computer by speech for the identifier assigned to the record. The computer responds with synthesized speech output of the record identifier. This helps the user to keep track of which record upon which is being worked, which the user may have forgotten or may not have known because of the manner in which the record was opened.

The present invention provides means for more than one electronic record to be "open" at once. It also provides rules and speech commands for governing which of these records is "active" (ready to receive inputs and provide outputs) at any given time.

Distinctive nonverbal auditory signals are included in the invention design to indicate to the user whether or not the system understood a spoken input to the record to be valid. Inputs signaled as invalid by a brief clicking sound are not committed to the record. Spoken inputs interpreted as valid data entries are signaled as such by a brief chime and are committed to the electronic record.

Users can monitor what the system interpreted as their input and committed to the electronic record by requesting synthesized speech feedback of what the system understood the user's input to be. This feature of the invention can be activated by a speech command such as "Start speech feedback" and deactivated by a speech command such as "End speech feedback."

Users can request output of the entire contents of the electronic record by issuing the command "Play back log." The system responds with a synthesized speech readout of the name, or label, and contents of each field. The present invention also enables a user to request the contents of a particular field by saying "Play back" followed by the name of the field. The system then responds with synthesized speech output of the contents of the requested field. The user can also request the contents of a particular predefined subset of fields by saying "Play back" followed by the name of the subset. The system responds by saying the label of each field in the requested subset followed by the contents of those fields.

The present invention also provides a spoken command mechanism for pausing the playback of a record and resuming its playback. It also allows the user to navigate forward and backward through readouts of the fields, one field at a time, by issuing "Back" and "Forward" commands in conjunction with the playback of a record.

Quick, efficient means of editing electronic records through speech input and audio output are thereby included in the present invention. If the user wishes to change what the system recognized as the input to a field immediately following that input before making another input, the user can simply say "Delete," which will remove the latest input from the electronic record. After saying "Delete," the user can speak some other input in place of the deleted one.

If the user wishes to edit a field other than the last one to which an entry was made, this can be accomplished quite flexibly through mechanisms included in this invention. First, during synthesized speech playback of the log of entries made to the record, when an entry is played that the user wishes to remove or change, the user can simply say "Delete" after hearing that entry, and it will be removed from the record. After the user deletes the entry, the playback halts, enabling the user to make a new entry in its place. If the user does not wish to make a new entry at that point, the playback can be resumed with the command "Continue playback." Likewise, if the user wants to go directly to a particular field and edit it rather than waiting until that field's contents are output during a playback of the log, the user can navigate back to that field by saying "Play back" followed by the name of the desired field. The system will respond with speech output of the contents of that field. At that point, the user can say "Delete" to remove the contents of that field, and this can be followed by input of new contents.

BRIEF DESCRIPTION OF THE FIGURES

FIG. 7 depicts a process for resuming synthesized speech output of multiple fields of a record following user-initiated suspension and for sequentially navigating through the fields, one field at a time, in response to user-spoken commands.

DETAILED DESCRIPTION OF THE INVENTION

Figure 1:
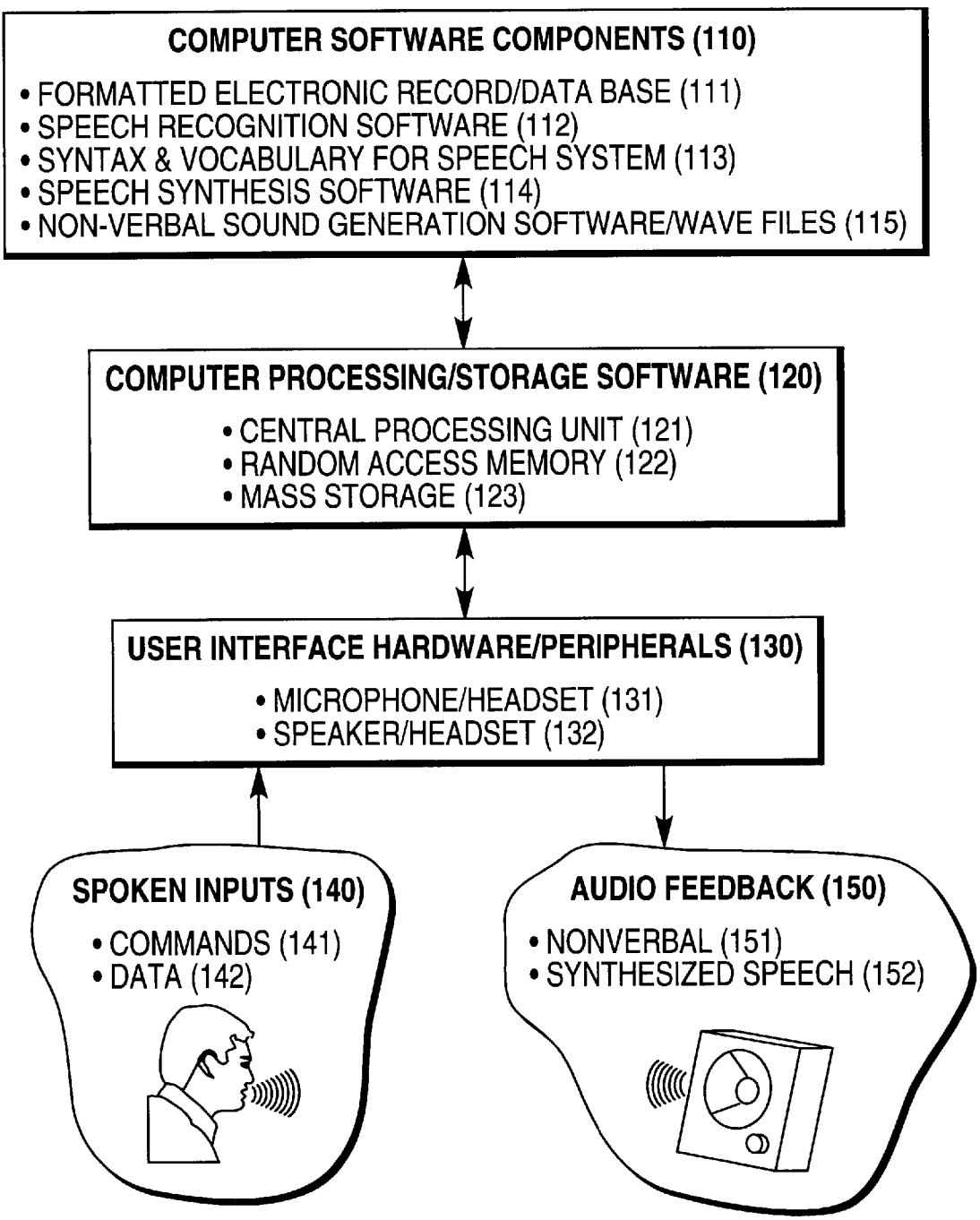
FIG. 1 depicts the hardware and software entities relevant to the present invention, as well as the input and output modalities for human-computer interaction included in the invention.

A preferred embodiment of the invention is now described in detail. Referring to the drawings, like numbers indicate like elements throughout the views.

1. The Basic Invention

The present invention comprises a user interface design that allows users to access and edit information in electronic records through speech input and audio output. The overall components of the invention are depicted in FIG. 1.

Referring to FIG. 1, the user speaks commands and electronic record contents, or data, into a microphone 131, which may be included in a headset, built into a computer, or be a freestanding microphone of some sort. The spoken input is converted into electrical impulses by the microphone and communicated to the computer 120. Using speech recognition software 112 stored in the computer's mass storage medium (e.g., hard drive) 123, the computer's central processing unit 121 interprets the inputs as commands that dictate computer actions and as data for the electronic record 111. The central processing unit 121 uses the syntax and/or vocabulary 113 predefined for the application to assist its interpretation of the spoken inputs. Random access memory 122 temporarily holds information that must be immediately accessible by the central processing unit 121 for carrying out this interpretation.

There are no strict requirements on the central processing unit 121 configuration required to implement this invention. However, a 133 MHz Pentium or faster processor is recommended, based on the inventors' experience. Likewise, 24 MB or more of random access memory is recommended. The inventors used the Windows 95 operating system in their development work. Any of a variety of speech recognition systems 112 could be used, but the inventors used the IBM Voice Type Application Factory, which was one of the better ones at the time of their experimentation. However, it is no longer sold. A good currently sold alternative for implementing speech recognition is the IBM Via Voice Developer's Toolkit. Any of a variety of speech synthesis systems 114 (described further below) could be used for providing audio feedback. The inventors used AT&T Flex Talk for this purpose, which is part of AT&T's Watson package. Eloquent Technology also has good speech synthesis tools. Some programming of the invention was done with the Smalltalk programming language. However, the Windows 95 operating system required that at least part of the programming for the invention be done with C—in fact, all of the programming could have been done in C. However, the inventors preferred to use Smalltalk where possible because of some of the advantages that it has for development in general (not just for programming speech-audio applications).

If the central processing unit 112 detects a discrepancy between what is input and the syntax or vocabulary predefined as allowable for the application 113, it provides an auditory indication of this 150 to the user. The present invention permits this auditory feedback to take a variety of forms, generated with either the synthesized speech software 114 or with nonverbal sound production software, such as a distinctive wave file 115, the latter being the preferred method. To produce the auditory feedback 150, the central processing unit sends electrical impulses to a speaker 132, which may be internal to the computer, in a headset, or in a freestanding configuration.

If the central processing unit 112 recognizes the input as valid, it responds appropriately, carrying out the command 141 (if one was issued) or committing the data 142 (if that was what the user communicated) to the appropriate field of the electronic record or data base 111, which is maintained in mass storage 123. When the computer interprets an input as valid, it provides the user with distinctive auditory feedback 150 to this effect. This feedback can be either nonverbal 151, such as a distinctive chime or wave file, and/or synthesized speech 152. Different kinds of nonverbal sounds can be used to indicate different kinds of processing (e.g., recognizing a data entry versus shutting down the application). Synthesized speech can be used to indicate the computer's interpretation of data-related input 142 for the user (e.g., repeating what the computer understood as the entry to a data field in the record or what it understood as the identification for the field to be opened or closed).

When the computer recognizes a command 141 from the user to play back the content of the electronic record 111 or some portion of it, it uses the speech synthesis software 114 to provide the content of the requested field(s) 111 in auditory form 152. If the computer recognizes a command 140 from the user to remove the content of some field of the electronic record 111, it carries out this command and allows the user to input other data 140 to the record 111 in place of what was removed.

2. Assumptions

Predefined data model and pre-assigned labels for fields. The design described here is based on an assumption that the user interface is interacting with a predefined data model 111. Specifically, this invention works with electronic records for which fields have already been defined with uniquely assigned names or labels to allow the user to refer to those fields by speaking their names or labels. It also assumes that, if the record has a hierarchical structure, names or labels referring to subsets of fields have already been uniquely assigned names or labels to allow the users to refer to those subsets by speaking their names or labels. The computer can use these same names or labels for synthesized speech outputs identifying for the user the fields or subset of fields for which contents are being output by the computer.

For example, in an electronic medical record application, each field which can interact with the speech-audio user interface would have a name associated with it, such as "temperature," "heart rate," "blood pressure," "Glasgow Coma Scale," "mechanism of injury," and "treatment." A subset of those fields (e.g., temperature, heart rate, and blood pressure) can also have a category name associated with it (e.g., "vital signs"). This makes it possible for the user to refer to an entire subset at once (e.g., request output of the values of all vital signs with one command rather than having to issue separate requests for temperature, heart rate, and blood pressure). When the computer outputs the contents of fields of the requested subset to the user, it precedes the readout of each field with the corresponding field identifier. Taking the medical example, when responding to a paramedic user's request for the vital signs in the patient electronic record, the computer 120 would respond with synthesized speech, saying something like "temperature 98, heart rate 72, blood pressure 130 over 64."

Choice of words. Choices of words defined as meaningful spoken inputs to the system and synthesized speech outputs from the system can vary from one implementation of this invention to another. The particular words chosen should be based on such things as what terms are meaningful to the user, what terms tend to be reliably interpreted by the speech recognition system 112, and what terms are appropriate for the application domain. Concrete examples of speech inputs and outputs will be provided in this description of the invention, but they are given for illustrative purposes rather than to limit the implementation of the concepts in the invention.

3. Methods of User-Computer Interaction

In order to make working with electronic records without the use of a visual display and hand-controlled input mechanisms as complete as working with them using a visual display and hand-controlled mechanisms, the present invention includes several speech and audio user interface mechanisms. Each allows a different type of functionality.

Figure 2:
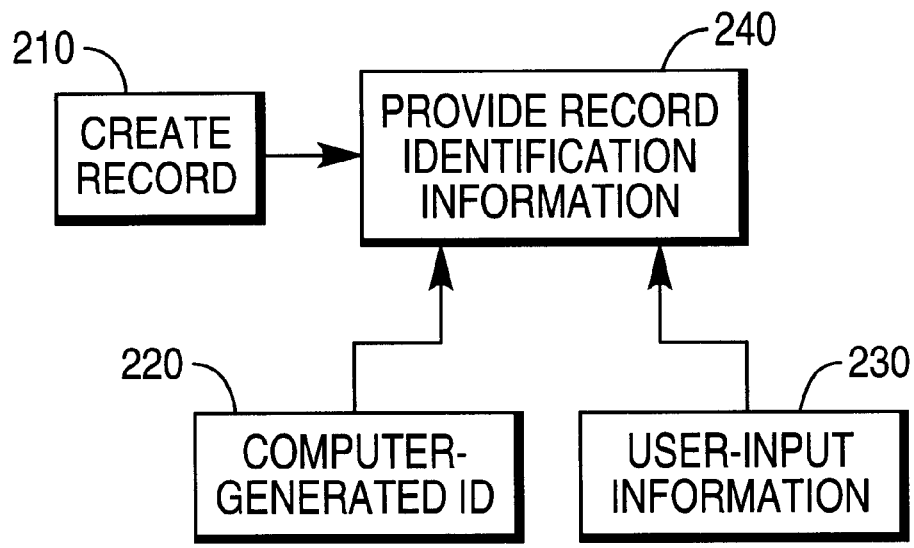
FIG. 2 depicts a process for initiating a new electronic record with which the user can interact through speech input and audio output.

Record creation With reference to FIG. 2, to begin assigning contents to fields in a record for the first time, the user must first create the record (step 210). To accomplish this, the user speaks a command ("New record") to create a new record. The result is to make available for inputs an electronic record with the pre-defined data structure and field names for use with the speech recognition and audio user interface.

Record identification. An identifying label may be assigned to each record (step 240). This allows the user to open and close particular records by name. It also allows the user to request the system to provide a synthesized speech identification of the currently open record(s) when the user needs a confirmation or reminder of the current record.

The present invention allows assignment of an audible identifier to a record in a couple of ways. First, a scheme can be adopted which allows the computer program to automatically assign identifiers to records as they are created [step 220]. For example, the system could assign a unique numerical identification to each record in sequence as each record is created. This could be used as a default identification mechanism. However, since it may be difficult for users to remember which numbers go with which records, another mechanism is for identification to be based on inputs made by the user to one or more fields in the record [step 230]. For example, in an electronic medical record, there might be a field for Social Security number, and the user could speak in that number as an identifier for the record by saying something like "Social Security number 1, 2, 3, 4, 5, 6, 7, 8, 9" (substituting the person's Social Security number). For some applications, it might be appropriate to identify the record with some sort of name (e.g., the name of a customer for whom the record was being created).

The contents of any field of a record can be used in identifying the record. Again using a medical illustration, it is possible that a paramedic will not have the name or Social Security number of a pedestrian hit by a car or a heart attack victim found in a public area. In that case, the identification for that record might just be the contents of the injury mechanism, type of injury, age, or treatment fields of the record, or some combination of those fields. Thus, if a paramedic only had two patients in the ambulance, it would be possible to distinguish their records on the basis of fields other than name or Social Security number by referring to one as the "fracture" and the other as the "laceration," assuming the patients had distinct types of injuries.

Figure 3:
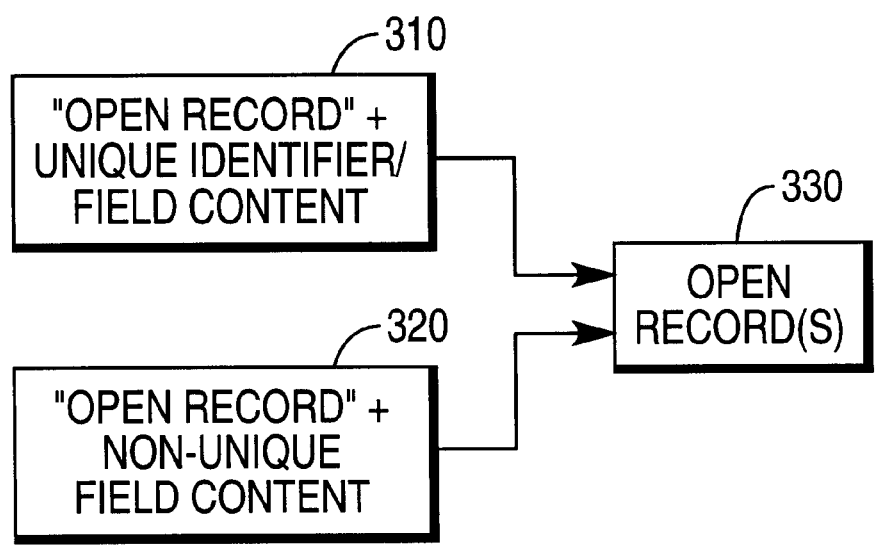
FIG. 3 illustrates two major speech-driven processes for opening a previously created electronic record.

Record opening. As shown in FIG. 3, after an identifier is available for a record, the user can open that record [step 330] and make it accessible for obtaining the contents of its fields and modifying those contents. This is accomplished by speaking a command such as "Open record" followed by the identifier(s) for that record [steps 310/320]. Thus the user could open the service record for an automobile by saying "Open record" followed by the manufacturer's identification number for the car, a unique identifier [step 310]. A patient record could be opened by saying "Open record" followed by the name of the patient (if name had been assigned as a record identifier) [step 310] or perhaps by saying the name of an identifying medical problem for the patient (e.g., saying "Open record laceration" in the example of the ambulance paramedic who only had two patient records, each for a person with a different injury type).

The present invention also allows the user to select records on the basis of non-unique field contents [step 320]. For example, in an automobile servicing application, the user could open the records for all cars in the shop requiring transmission work by saying something like "Open record transmission problem." Using a medical example, a paramedic at the scene of an explosion might want to review the status of all patients with a triage priority of "immediate." In that case, the user could request opening of all records with a value of "immediate" in the triage priority field. These records could then be reviewed in succession before the patients were placed into the ambulance.

Figure 4:
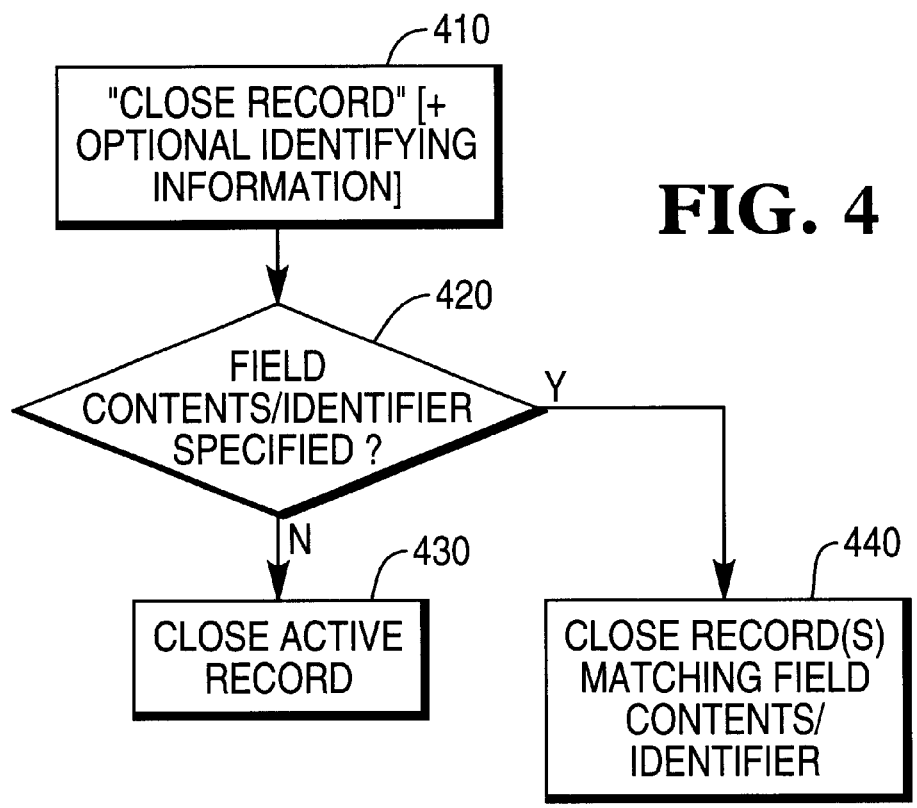
FIG. 4 depicts two processes for closing one or more open electronic records through speech commands.

Record closing. A currently open record can be closed through a speech command similar to the way it was opened, as illustrated in FIG. 4. When the user says "Close record" [step 410], the computer's central processing unit 121 checks whether or not this phrase is followed by any identifying information (content of a data field) that specifies which record(s) to close [step 420]. If no specification is provided, the currently active open record is closed [step 430]. (The concept of an "active" record is outlined in further detail below. However, it is similar to the notion of an active window where each window is displaying a different record/file.) It is assumed that this will be the most common means for closing a window, since it requires few words, and users will most likely want to close out the current object of their attention rather than another one.

If the user says "Close record" followed by some record identifier, that record is closed even if it was not the currently active one [step 440]. Likewise, the user can simultaneously close several active records [step 440] by following the "Close record" command by the value of a field that is shared by several records. As a medical illustration, the user could say "Close record fracture," and all currently open records that have "fracture" in the injury field would be closed. Finally, if the user simply says "Close record" without any identifier, the currently active open record is closed. (The notion of "active" open records will be further discussed in further detail below).

Figure 5:
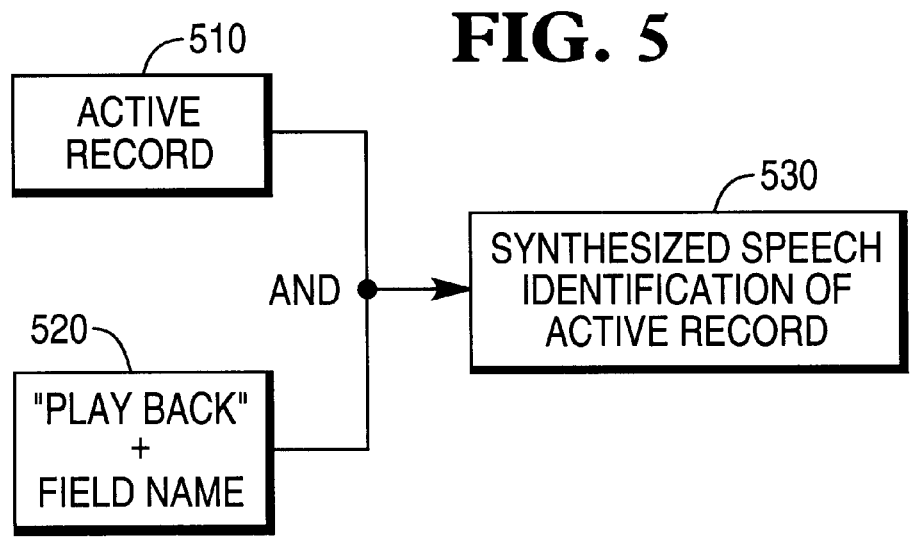
FIG. 5 depicts a process allowing a user to find the identity of the currently active record through speech-audio input/output when the identity was forgotten or otherwise unknown.

Accessing identifier for active open record. As shown in FIG. 5, the present invention provides a means by which users can obtain an audible identification of the record with which they are working to help them when they forget or are unsure which record is active [step 510]. This can be obtained by speaking a command such as "Play back ID" or "Play back" followed by the label for any field in the electronic record (e.g., "Play back serial number" or "Play back injury") [step 520]. The system then provides auditory feedback to identify the record with which the user is working [step 510] by providing the identifier associated with the record or the contents of whatever field was requested [step 530].

For example, in a medical information system, the system's response to "Play back ID" would be a synthesized speech output of the name or Social Security number of the patient for whose record is being accessed. In an automobile repair record example, the system's response might be a synthesized speech output of the automobile's serial number or the year, name, model, and color of the vehicle.

Switching between several open records. The present invention has an audiospeech user interface method of permitting several records to be open at once and of switching which one is active at a given time (i.e., actually being worked with). This provides functionality equivalent to that of a graphical, windowing user interface, which permits several files of a particular type to be open at once, but only one to be "active" at a time. For example, in a windowing user interface, a computer word processor could have files associated with several files open at once, and the user could switch back and forth between them using manual control mechanisms, such as menu choices or keyboard controls.

With the present invention, more than one file or electronic record can be "open" at a time. However, only one is "active" (i.e., being reviewed or modified by the user) at a time. If only one record is open, by default it is active. If more than one record is individually opened, the most recently opened record is active by default (i.e., speech inputs from the user will be directed to that record). If several records are opened at once (as in a medical information system for which the user said "Open record fracture" and records of several patients who had fractures listed in the injury field were opened), any of a variety of rules could be set up to govern which record is initially active. For example, in a medical information system, their order of activation could correspond to the triage priority of the patients or to the alphabetical order of their names.

The present invention provides several user interface mechanisms for changing which of two or more open windows is active. First, the user can move from one record to another by saying a command such as "Switch to" followed by an identifier in one of the fields of the record.

Second, if the user opened or activated the records one at a time, a command such as "Previous record" allows the user to move back to the record that was originally active before the current one. This command can be issued in succession, with each use working through the records in reverse of the order in which they were first opened or activated. This scheme relies on the order in which the records were first opened or activated so that users can move through all open records rather than being caught in a loop between only two records, the currently active one and the one most recently active. Once the user reaches the first record that was opened or activated, further issuance of the "Previous record" command results in audio feedback to the user indicating that the first opened or activated record has been reached. This feedback could be in the form of a non-verbal sound (e.g., a distinctive tone or wave file) or synthesized speech (e.g., "You have reached the first record").

The user can move in the other direction through the open records by saying a command such as "Next record." This moves the user ahead in the "stack" of records, with each successive issuing of this command activating a record closer to the last one that was initially opened or activated. When the user reaches the last record to be originally opened or activated, additional issuance of "Next record" results in audio feedback indicating this. This feedback could be in the form or a non-verbal sound (e.g., a distinctive tone or wave form) or synthesized speech (e.g., "You have reached the last record").

The present invention also provides a means by which the user can navigate across open records without having to use the contents of a particular field as the basis for activation and without having to navigate to it by successively activating records one at a time. However, like the mechanism for successively activating records based on a sequential ordering scheme, this aspect of the invention is based on the position of the record in the sequence of open records. The user can say "First record" to activate the first record in the sequence (the first record that was opened or the first record according to some other ordering scheme, such as alphabetical or numerical order). The user can say "Last record" to activate the last record in the sequence (the last record to be opened or the last record according to some other ordering scheme). The user can also say "Middle record" to go to the middle of the sequence. Records can also be activated by saying their precise position in the sequence (e.g., "Record position two").

There can be several advantages to having multiple records open at once in a speech-audio interface and then activating particular records when needed rather than allowing only one record to be open at once. First, similar to the case for visual interfaces, once a record is open, it often takes the computer less time to make a record active than it would for the computer to activate it by reopening its file from the hard drive. Thus, if a user expects to be going back and forth between records, efficiency can be gained by opening a record and then leaving it open throughout the time that the user might wish to review it or modify it, even if the user is currently working on a different active record. Second, some applications may involve interaction with open records as a background processing activity. If the record is open, the application can automatically provide alerts to the user about these interactions. Again using a medical information system illustration, it is possible to have patient monitoring equipment automatically providing inputs to all patient records that are open. If the application included an intelligent agent monitoring patient condition, the user could receive a synthesized speech alert that a patient's vital signs were in a danger zone even if the record for that patient was not currently active. At that point, the user could issue a speech command to activate that patient's record to review its contents and make additional inputs based on clinical observations or treatments that took place.

Immediate feedback on phrase validity. This aspect of the invention checks the validity of spoken inputs to the record [140 in FIG. 1] and provides distinct audio indications 150 of whether or not the system understood the spoken inputs as valid. It relates to implementations in which allowable inputs are predefined for the record as a whole or for particular fields within the record. For example, the present invention can take advantage of cases in which there is a predefined allowable vocabulary for the record and/or a predefined syntax for speech inputs 113. When a syntax is predefined, the system can be set up to allow only certain terms in certain positions of the input or in conjunction with other terms in the input.

As an example in the medical domain, inputs could be restricted to terms that were predefined as relevant to the patient record data model. Thus "fracture" would be a valid input, but "reindeer" would not. Taking advantage of syntactical restrictions, the system could allow input of "98" after the word "temperature" is spoken but not after the term "mechanism of injury" is spoken.

The present invention provides distinctive kinds of feedback 150 to the user about the validity of what the system understood the spoken inputs to be in cases where there is a predefined vocabulary and/or syntax for spoken inputs. After a user has said a word or phrase intended as a command or an input to an electronic record, if the system recognizes the input as valid, it emits an audible tone (e.g., a chime sound) 150. The command is then executed or the data interpreted from the spoken input is committed to the record 111. If the system does not recognize the input as something that matches the vocabulary that was previously designated as allowable, a different type of sound (e.g., a click) 150 is emitted, and the computer 120 does nothing further in reaction to the spoken input. This signals the user to attempt the input again or to change the word or phrase so that it is valid with respect to the allowable vocabulary or syntax.

An advantage to using the brief, distinctive, audible tones to signal input validity is that they take little time, allowing the user to quickly proceed with additional inputs to the record after the validity of their preceding input is confirmed. They can also be made easy to identify and distinguish from each other and from background sounds typically encountered by the users (e.g., talking, motors, air conditioner motors, etc.). Because speech recognition systems are not yet as reliable as manual entry devices (e.g., keyboards) and since users sometimes make incorrect inputs, such a built-in validity checking mechanism can considerably improve the quality of inputs to electronic records.

Immediate feedback on how spoken input was interpreted. The present invention includes a user-set option whereby the system can play back via synthesized speech 150 in FIG. 1] what it interpreted as the word or phrase input by the user for the electronic record. This allows the user to monitor what is going into the electronic record and to know immediately if the system misinterpreted what was originally input (i.e., if the system substituted a valid term, but one not actually input by the user, for the one that the user had spoken). Users may activate this automatic synthesized speech feedback or deactivate it through speech commands (e.g., by saying something like "Start speech feedback" or "End speech feedback," respectively), depending on whether or not they find the error-detection value of this confirmation to be worth the extra time and attention it takes to listen to it.

Playback of electronic record on command. Besides the possibility of receiving automatic playback of each word or phrase immediately following its input to a particular field of an electronic record, the user may subsequently request synthesized speech playback of the entire record or selected portions of it. Some of the processes for controlling synthesized speech output of an electronic record through commands spoken by the user are shown in FIG. 6.

If the user says "Play back log" [combination of 610 and 621], the system will play back via synthesized speech the content of all the fields in the currently active electronic record 631. The user can also request playback of a subset of fields 632 or individual fields 633 by using the names that designate either the subset 622 or individual fields 623 with the "play back" phrase 610. For example, if the user wanted to know the current content of a particular subset of an electronic medical record, a phrase like "Play back vital signs" could be spoken, and the system would return the labels of the individual fields in the vital signs part of the record along with their associated values (e.g., "Blood pressure 127 over 85, pulse 89, respiratory rate 12, oxygen saturation 97, temperature 98.6"). Similarly, if the user wanted to know the content of an individual field in the same application, it would be possible to say something like "Play back temperature," and the system would provide audio output of the content of that field alone.

Figure 6:
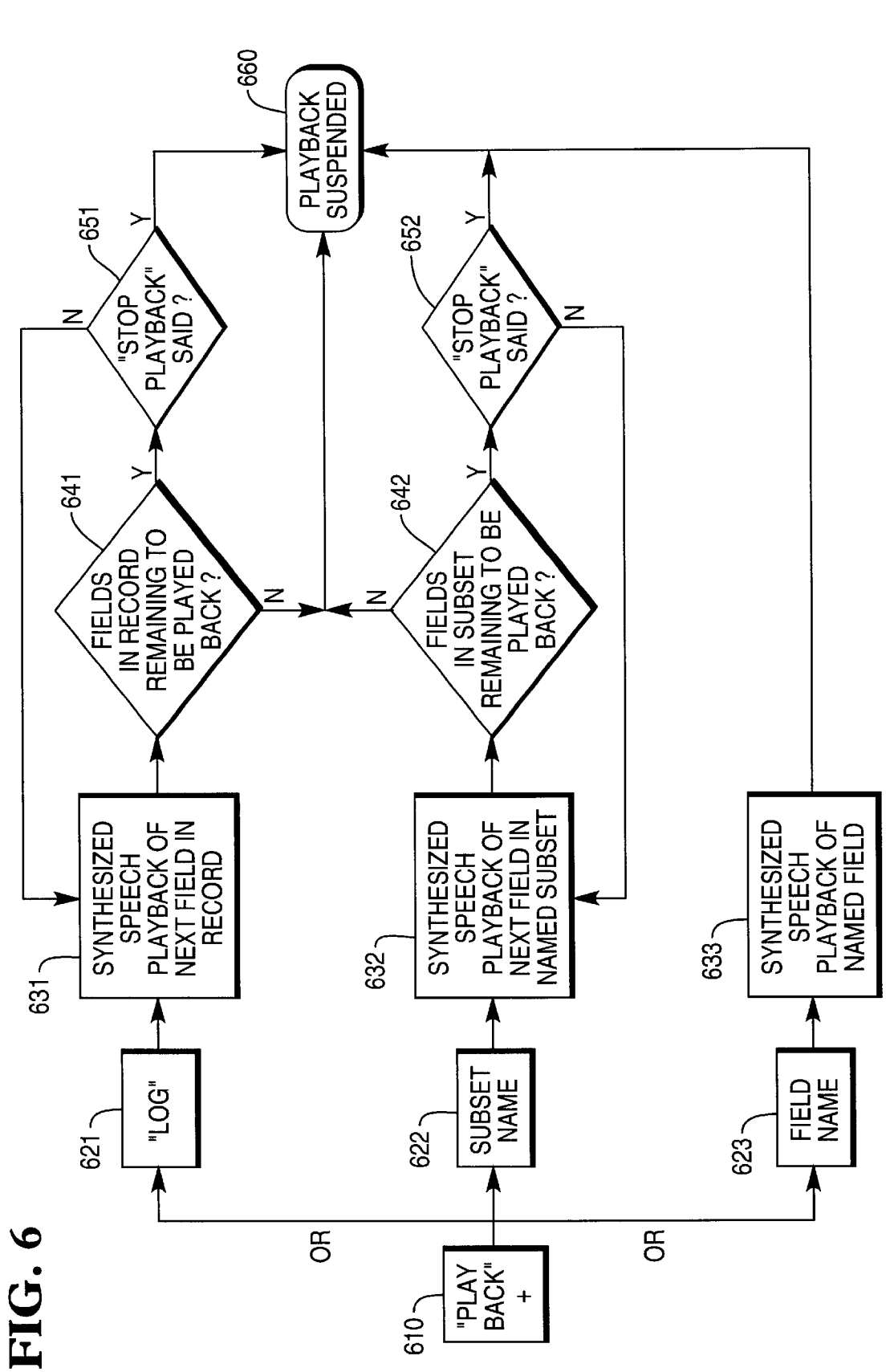
FIG. 6 depicts a process for accommodating output of all the fields in a record or a named field or subset of fields through one spoken command from the user, and a process allowing the user to suspend playback through a single spoken command.

FIG. 6 shows that the computer 120 will direct synthesized speech output of the fields of the electronic record until none of the requested fields remain unplayed, as determined by the central processing unit's 121 monitoring of the what has been output from the data fields [641 and 642].

If the user wishes to stop playback of the entire record or a subset of its fields at any point, a simple command such as "Stop playback" [651 and 652] could be spoken. The system would suspend playback at that point 660.

As shown in FIG. 7, if, after suspending playback 710, the user wants the system to continue playback of the entire record or subset of the record from the point where it was halted, this can be accomplished through another spoken command, such as "Continue playback" 721. If this command is issued, fields continue to be output 751 as long as there is another field in the record or subset remaining 731 and no other suspension command 761 is issued.

In some situations, the user may want to perform a speech-audio equivalent to what is accomplished by "scrolling" through information on visual computer displays. This will allow the user to obtain the playback of a single field at a time, which can be particularly valuable if the user wants to listen again to an entry that was heard in an earlier part of a playback. Likewise, the user can move forward one entry at a time so that the record can be reviewed at a pace that is consistent with availability of the user's time and attention. To have fields of the log repeated one field at a time from where playback stopped, the user can say a simple command like "Back" 723 and the last played entry will be repeated 753. Each additional time the user says "Back," the system will repeat the next preceding entry in the record. Once the system determines that there are no previous fields in the record left to be played 733 in response to a "Back" command, further playback is stopped 710. This may be accompanied by a verbal or nonverbal auditory signal to the user that the "top field" has been reached. Alternatively, the invention allows the possibility for a "wrap" through the record, such that the readouts loop back to the last field of the record once the first one has been reached and another "Back" command has been issued.

If the user says "Forward" 722, the system will play the next entry in the record from the place where the playback had been halted or will play one entry at a time from the beginning of the record 752. Similar to the case for repeated uses of the "Back" command, once the system determines that there are no more fields left in the record to be played in response to "Forward" because the "bottom" of the record has been reached 732, it will cease further playback 710. Again, this cessation of further playback may be accompanied by an auditory signal to the user that the bottom of the record has been reached. As was the case with backward movement through the record, this invention allows the option of implementing looping in the forward direction so that the system automatically reads out fields from the top of the list after the bottom has been reached and another "Forward" command is issued.

What is considered the "top," "bottom," "beginning," or "end" of the record can be set in a number of ways. These include such things as time an entry is made, order of criticality, some other predetermined logical ordering of fields, or some convention for ordering the fields with which users might already be familiar (e.g., the order corresponding to the arrangement of the fields on a familiar visual presentation of the record). Likewise, the order in which items from the record are played back when the user requests a playback of the entire record or of a subset of the record can be set by the application developer. Such things as the order in which the fields occur in a familiar visual display of the same kind of information can be used to determine playback order, as can such things as order of criticality, order in which the user would normally work with the various fields, or with some other sequencing scheme.

Editing immediately following input. If the user wishes to change what the system recognized as the input to a field immediately following that input before making another input, the user can say a simple phrase like "Delete," which will remove the latest input from the electronic record. This will be convenient in situations where the immediate playback of what is input to the patient record enables the user to know that the system misinterpreted the spoken word or phrase. It will also be helpful in cases where the user made an incorrect input, realizes it, and wants to change it. After saying "Delete," the user can input the phrase again so that the correct word or phrase is said and properly interpreted by the system.

Editing following on-command playback of record. There will sometimes be cases in which the user will not want to change the record until a playback of the entire log or selected portions of it occurs. In such a situation, the user can remove an undesired entry from the record by issuing a command, such as "Delete," immediately following the audio playback of that entry in the record. At that point, the entry is removed and playback stops, allowing the user to input a new word or phrase for the record. If the user wishes to continue playback of the record from the point at which it was halted with the "Delete" command, another simple phrase, such as "Continue playback" can be spoken 721, and the system will restart its playback from where it left off. Likewise, if the user wants to go directly to a particular field and edit it rather than waiting until that field's contents are output during playback of the log, the user can navigate back to that field by saying "Play back" 610 followed by the name of the desired field 623. The system will respond with speech output of the contents of that field. At that point, the user can say "Delete" to remove the contents of that field 633. If the user wants to substitute a different input at that point, he can speak the new contents, and it will be input to the field where the contents had just been deleted.

The present invention has been described previously in a preferred embodiment. It will be understood by those having ordinary skill in the art that the present invention may be implemented in a variety of ways, while still remaining within the scope of the claims set forth below.

What is claimed is:

1. A speech and audio editing system, comprising:
   (a) a storage device for storing data records, each data record including at least an identifier and data elements;
   (b) a user interface device for receiving audible signals representing either a data element to be stored in a data record or an editing command to be performed on a data element in a data record;
   (c) a processor for performing the steps of:

(i) determining that a first audible signal received by the user interface device corresponds to a command for selecting a data record to be active;

(ii) selecting a data record whose identifier corresponds to an identifier within a second audible signal received by the user interface device;

(iii) editing at least one of the data elements within the selected data record in response to a third audible signal received by the user interface device.

2. The system of claim 1, wherein the computer processor performs an editing command comprising a DELETE function.

3. The system of claim 1, wherein the computer processor performs an editing command comprising a REPLACE function.

4. The system of claim 1, wherein the storage device allows multiple data records to be open at any one time.

5. The system of claim 1, and further comprising a speech synthesizer for audibly outputting the contents of a data record to a user.

6. The system of claim 5, wherein the editing command comprises instructing the system to audibly output selected data elements of a selected data record.

7. A speech and audio editing process, comprising the steps of:

(a) receiving a first speech signal from a user via user interface hardware;

(b) selecting a data record for editing in response to said first speech signal;

(c) receiving a second speech signal from said user via said user interface hardware; and (d) performing an editing command on a data element in a data record in response to said second speech signal.

8. The process of claim 7, wherein the step of performing an editing command comprises executing a DELETE function.

9. The process of claim 7, wherein the step of performing an editing command comprises executing a REPLACE command.

10. The process of claim 7, and further comprising the step of audibly outputting to the user in response to a third speech signal selected data elements of a selected data record.

11. The process of claim 7, wherein the stop of selecting a data record for editing further comprises selecting data records in a non-sequential fashion.

* * * * *